(12) United States Patent
Melero

(10) Patent No.: US 6,928,267 B2
(45) Date of Patent: Aug. 9, 2005

(54) ESTIMATING AN INDICATOR FOR A COMMUNICATION PATH

(75) Inventor: Juan Melero, Digswell (GB)

(73) Assignee: Nokia Corporation, Espoo (FI)

(*) Notice: Subject to any disclaimer, the term of this patent is extended or adjusted under 35 U.S.C. 154(b) by 408 days.

(21) Appl. No.: 10/089,421

(22) PCT Filed: Sep. 27, 2000

(86) PCT No.: PCT/EP00/09499

§ 371 (c)(1),
(2), (4) Date: Jul. 15, 2002

(87) PCT Pub. No.: WO01/24418

PCT Pub. Date: Apr. 5, 2001

(65) Prior Publication Data

US 2004/0224639 A1 Nov. 11, 2004

(30) Foreign Application Priority Data

Sep. 29, 1999 (GB) ............................................. 9923069

(51) Int. Cl.⁷ .............................................. H04B 17/00
(52) U.S. Cl. .................... 455/67.11; 455/436; 455/437; 455/439; 455/442; 455/69; 455/453; 455/553.1; 375/132; 375/325; 375/340; 375/341; 375/262; 370/330; 370/332; 370/333; 370/336; 370/338
(58) Field of Search ................................ 455/436, 437, 455/439, 67.11, 69, 442, 453, 553.1, 88; 375/132, 325, 340, 341, 262

(56) References Cited

U.S. PATENT DOCUMENTS

| | | | |
|---|---|---|---|
| 5,805,995 A | * 9/1998 | Jiang et al. | 455/436 |
| 5,828,672 A | 10/1998 | Labonte et al. | 371/5.5 |
| 5,839,056 A | * 11/1998 | Hakkinen | 455/69 |
| 5,898,928 A | 4/1999 | Karlsson et al. | 455/450 |
| 6,073,257 A | * 6/2000 | Labonte et al. | 714/704 |
| 6,108,374 A | * 8/2000 | Balachandran et al. | 375/227 |
| 6,188,900 B1 | * 2/2001 | Ruiz et al. | 455/436 |
| 6,215,827 B1 | * 4/2001 | Balachandran et al. | 375/262 |
| 6,289,217 B1 | * 9/2001 | Hamalainen et al. | 455/425 |
| 6,347,217 B1 | * 2/2002 | Bengtsson et al. | 455/67.7 |
| 6,385,173 B1 | * 5/2002 | Lindskog et al. | 370/252 |
| 6,490,461 B1 | * 12/2002 | Muller | 455/522 |
| 6,542,742 B2 | * 4/2003 | Schramm et al. | 455/436 |
| 6,782,262 B1 | * 8/2004 | Lundborg | 455/449 |

FOREIGN PATENT DOCUMENTS

WO       WO 99/34531       7/1999       ........... H04B/7/005

* cited by examiner

Primary Examiner—Marceau Milord
(74) Attorney, Agent, or Firm—Cohen, Pontani, Lieberman & Pavane

(57) ABSTRACT

The present invention relates to estimation of a network indicator of a communication path between a first station and a second station in a communication system. A first indicator of the communication path in a direction from the first station to the second station is determined at the second station. A second indicator of the communication path in a direction from the second station to the first station is determined at the first station. Said second indicator associates to a corresponding feature of the communication path than said first indicator. A third indicator of the communication path in the direction from the first station to the second station is determined at the second station. The network indicator of the communication path in the direction from the second station to the first station is then estimated based on the determined first, second and third indicators.

21 Claims, 2 Drawing Sheets

ESTIMATING AN INDICATOR FOR A COMMUNICATION PATH

PRIORITY CLAIM

This is a U.S. national stage of PCT application No. PCT/EP00/09499, filed on Sep. 27, 2000. Priority is claimed on the following application: Country: Great Britain application No. 9923069.0 filed in Great Britain on Sep. 29, 1999.

FIELD OF THE INVENTION

The present invention relates to a communication path or link in a communication system, and in particular, but not exclusively, to estimation of an indicator for use in managing a communication path between at least two stations of a communication system.

BACKGROUND OF THE INVENTION

A communication network may comprise a cellular radio network consisting of cells. The cellular telecommunication networks typically operate in accordance with a given standard (or several standards) which sets out what the elements of the network are permitted to do and how that should be achieved. In most cases a cell can be defined as a certain area covered by one or several base transceiver stations (BTS) serving mobile stations (MS) within the cell via a radio interface. Each base-station has a radio transceiver capable of transmitting radio signals in downlink to and receiving radio signals in uplink from the area of a cell next to the base-station. By means of these signals the base station can communicate with the mobile station (MS) terminal in that cell, which itself includes a radio transceiver. Each base station may be connected to a base station controller (BSC) or to any other controller functionality provided by the cellular network. Thus a mobile station (MS) or similar user equipment (UE) within a cell of the system is continuously controlled by a node providing controller functionality. Examples of the network controller include said base station controller (BSC), a radio network controller (RNC) and a mobile switching center (MSC), but other control nodes may also be used for the implementation of the network control functionality. The controller can be linked further to the public telephone network and/or to other networks such as packet data networks. By means of this system a user of the MS can establish a telephone call to the public network via a BS in whose cell the MS is located.

The location of the MS could be fixed (for example if it is providing radio communications for a fixed site) or the MS could be moveable (for example if it is a hand portable transceiver or "mobile phone"). When the MS is moveable it may move between cells of the cellular radio system. As it moves from one cell (the "old cell") to another cell (the "new cell") there is a need to hand it over from communication with the BS of the old cell to the BS of the new cell without dropping the call due to a break in communications between the mobile station and the network. This process is known as handover. A need can also arise to hand over a MS whose location is fixed, for example if atmospheric conditions affect its communications with the old BS and call quality can be improved by handing it over to another BS or if there is a need to free up capacity of the old BS.

In some cellular systems a mobile station is capable of making traffic communications with more than one base station at one time. This macrodiversity arrangement allows greater reliability of communications and can reduce the required transmission power. It also means that handovers between one base station and another can be performed in a gradual ("soft") rather than an abrupt ("hard") way.

The control node conventionally receives information relating to the quality of communications between the MS and the BSs and optionally other information such as data on the load on at least some of the BSs. The control node uses this information to various functions. For example, by using this information the control node may determine which base station(s) an MS should communicate with and issues instructions to the BS and the MS accordingly.

The mobile station and/or the base station may measure and/or define several indicators or parameters concerning the communication path connection, such as quality of the received signal, signal levels (power) between the receiving and transmitting stations, distance between the stations and so on. The stations can be provided with appropriate means for defining a value for any parameter that can be measured for the interaction between the mobile station and any of the base stations or the radio transmission conditions in a cell.

In a cellular radio communication system, such as the GSM based systems, voice quality in a transmission over a communication path between a base station and a mobile station can be assessed based on a network indicator determined for the connection. Corresponding indicators may be defined both in uplink and downlink.

Currently the most commonly used quality parameter or indicator is so called Bit Error Ratio (BER), which is used e.g. in the GSM (Global System for Mobile) based network systems. The BER is a measure defining the level of quality for data transmission expressed as the relationship between erroneous bits and the total number of transmitted bits. The BER can be defined e.g. by sending a known bit pattern and counting the number of incorrectly received bits in the receiver.

A problem with the BER is that it measures the rate of the bit errors before an error correction mechanism. Therefore it does not take any improvements possibly produced by the error correction mechanism into the connection quality. If the functionality and/or efficiency of the error correction mechanism changes during the operation of the system, the BER values may no longer provide reliable information for assessing the quality of the transmission. The reliability of the BER based quality estimations may also become poorer due to new functionalities introduced into the network. The new functionalities could be such as Frequency Hopping or dynamic Channel Coding.

The inventor of the present invention has identified that frame erasure ratio (FER) could form a network indicator that could be used for the transmission quality estimation and that by using FER at least some of the problems of the BER could be avoided. In general, the FER represents the percentage of frames being dropped due to high number of non corrected bit errors in the frame. The FER can be a measurement of the results of 3-bit cyclic redundancy check for speech channels that is made along with a bad frame indicator (BFI). For signalling channels the FER is a measurement of errors in the block code used for the transmission.

A problem with the FER is that the current terminals do not report downlink FER to the network. There is no appropriate solution to manage the current terminals in a system that may base the connection control to an indicator such as the FER. It would thus be desirable to be able to define the FER or a similar network indicator by some other means than by receiving information of the indicator from a terminal that received the transmission.

SUMMARY OF THE INVENTION

It is an aim of the embodiments of the present invention to address one or several of the above problems.

According to one aspect of the present invention, there is provided a method in a communication system for estimating a network indicator of a communication path between a first station and a second station comprising:

determining at the second station a first indicator of the communication path in a direction from the first station to the second station;

determining at the first station a second indicator of the communication path in a direction from the second station to the first station, said second indicator associating to a corresponding feature of the communication path than said first indicator;

determining at the second station a third indicator of the communication path in the direction from the first station to the second station; and estimating the network indicator of the communication path in the direction from the second station to the first station based on the determined first, second and third indicators.

According to another aspect of the present invention there is provided a communication system comprising a first station; a second station; a communication path between the first and the second stations; a measurement unit at the second station for determining a first indicator of the communication path in a direction from the first station to the second station; a measurement unit at the first station for determining a second indicator of the communication path in a direction from the second station to the first station, said second indicator associating to a corresponding feature of the communication path than said first indicator; a measurement unit at the second station for determining a third indicator of the communication path in the direction from the first station to the second station; and control unit for estimating a further indicator of the communication path based on the determined first, second and third indicators.

According to further aspects the second station comprises a base station of a cellular communication system, the first station comprises a mobile station of the cellular communication system, the communication path comprises a radio link between the stations, the first indicator comprises a bit error ratio in uplink direction, the second indicator comprises a bit error ratio in downlink direction; the third indicator comprises a frame erasure ratio in uplink direction; and the network indicator to be estimated comprises a frame erasure ratio in downlink direction.

The estimated network indicator may be used for assessing the quality of the communication path.

The network indicator may be obtained based on a correlation between the first indicator, the second indicator and the third indicator. The network indicator may be obtained by multiplying said second indicator by the third indicators and dividing the result by the first indicator.

Information about the first indicator, the second indicator and the third indicator may be passed to a controller of the communication system and computing the network indicator by the controller.

BRIEF DESCRIPTION OF THE DRAWINGS

For better understanding of the present invention, reference will now be made by way of example to the accompanying drawings in which.

DESCRIPTION OF PREFERRED EMBODIMENTS OF THE INVENTION

The present reporting method and associated apparatus will be described below with general reference to the GSM system, but it will be understood that the method is analogously applicable to provide enhanced parameter estimation in other telecommunications systems.

Figure 1:
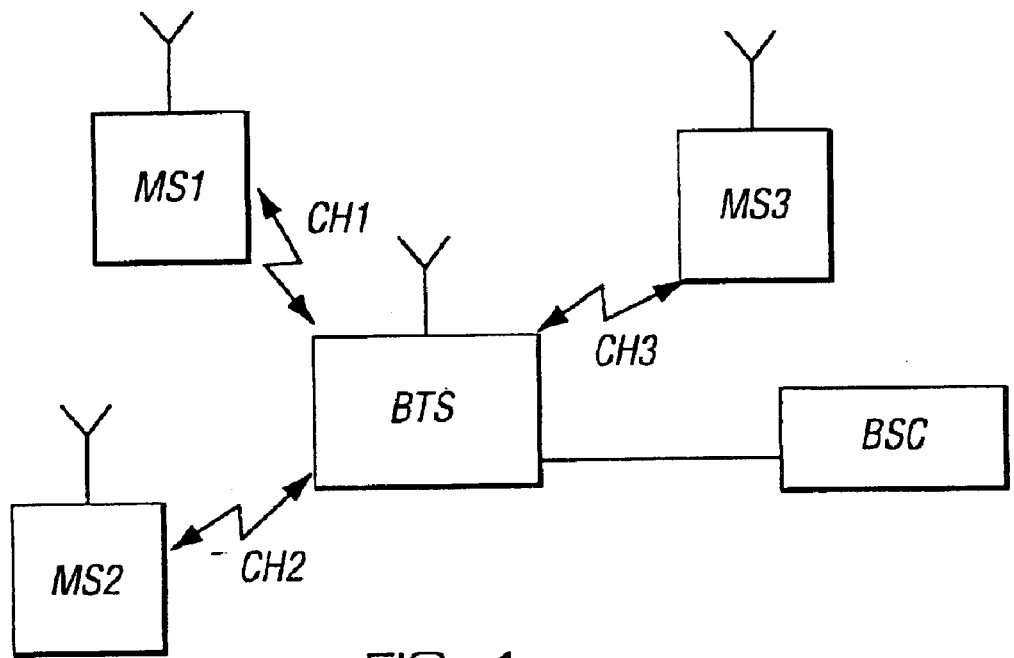
FIG. 1 shows schematically the configuration of a part of a typical cellular radio telecommunications network.

Reference is made to FIG. 1 illustrating one system in which the embodiments of the invention may be employed. The exemplifying system is a mobile radio communication system allowing a plurality of mobile stations MS1, MS2, MS3 to communicate with a base (transceiver) station BTS in a common cell via respective channels CH1, CH2, CH3. Although not shown, the mobile stations may also move from one cell to another cell. The radio communication between a transmitting station and a receiving station may be implemented in any appropriate manner and may be based on any communication standard. Therefore the communication path as such will not be described in more detail herein. It is sufficient to note that each base transceiver station (BTS) is arranged to transmit signals via a radio interface or link to and receive signals from the mobile stations MS located in a cell associated with the given base transceiver station. Likewise, each mobile station MS is able to transmit signals to and receive signals via a radio interface or link from the base transceiver station BTS.

The base station is connected to a controller, which in one form of the exemplifying GSM system comprises a base station controller (BSC). The BSC may be connected further to a Mobile Switching Centre (MSC; not shown). In the described embodiment the BSC is used as a radio network controller. However, in some arrangements the MSC could be used for controlling one or several base stations. In some embodiment the BSC between the MSC and the base station may also be omitted. The network controller functionality is for controlling its service area, i.e. the cells and base stations connected to it. It is noted that typically more than one network controller is provided in a network. The network controller is also connected further to other elements or parts of the telecommunications network system via a suitable linking or gateway apparatus, such as Gateway Mobile Switching Centre (GMSC; not shown).

The implementation of the basic communication formatting between the mobile station, the base station and the controller in GSM systems is known, and will thus not be discussed in more detail herein. It is sufficient to note that the interface may comprise channels in both uplink and downlink directions between the mobile station in the cell associated with a given base station and that the information sent to and from the mobile station may be sent in any suitable format. The information may include, for example, an identification of a mobile station in a message sent from the mobile station identifying the particular mobile station (for instance, MS ID and/or IMSI (Mobile Station Identity and/or International Mobile Subscriber Identity, respectively)).

Figure 2:
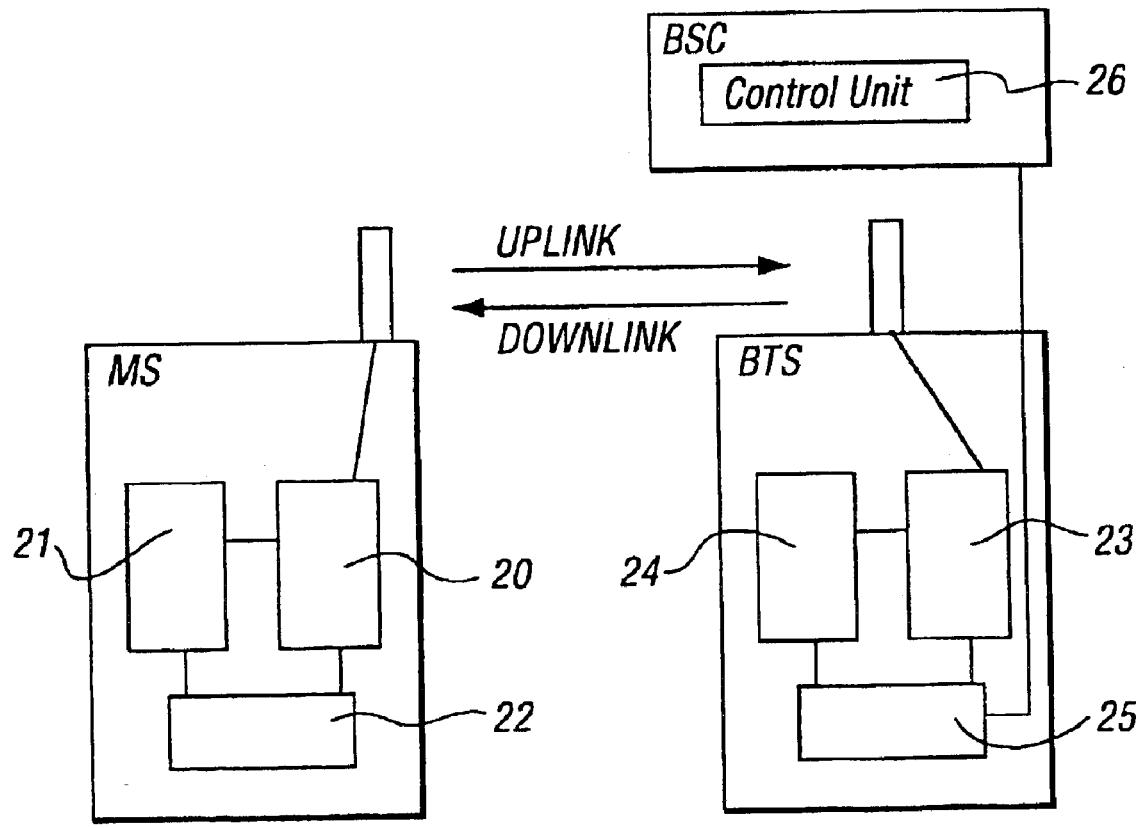
FIG. 2 is a more detailed illustration of a mobile station and base station pair.
Figure 3:
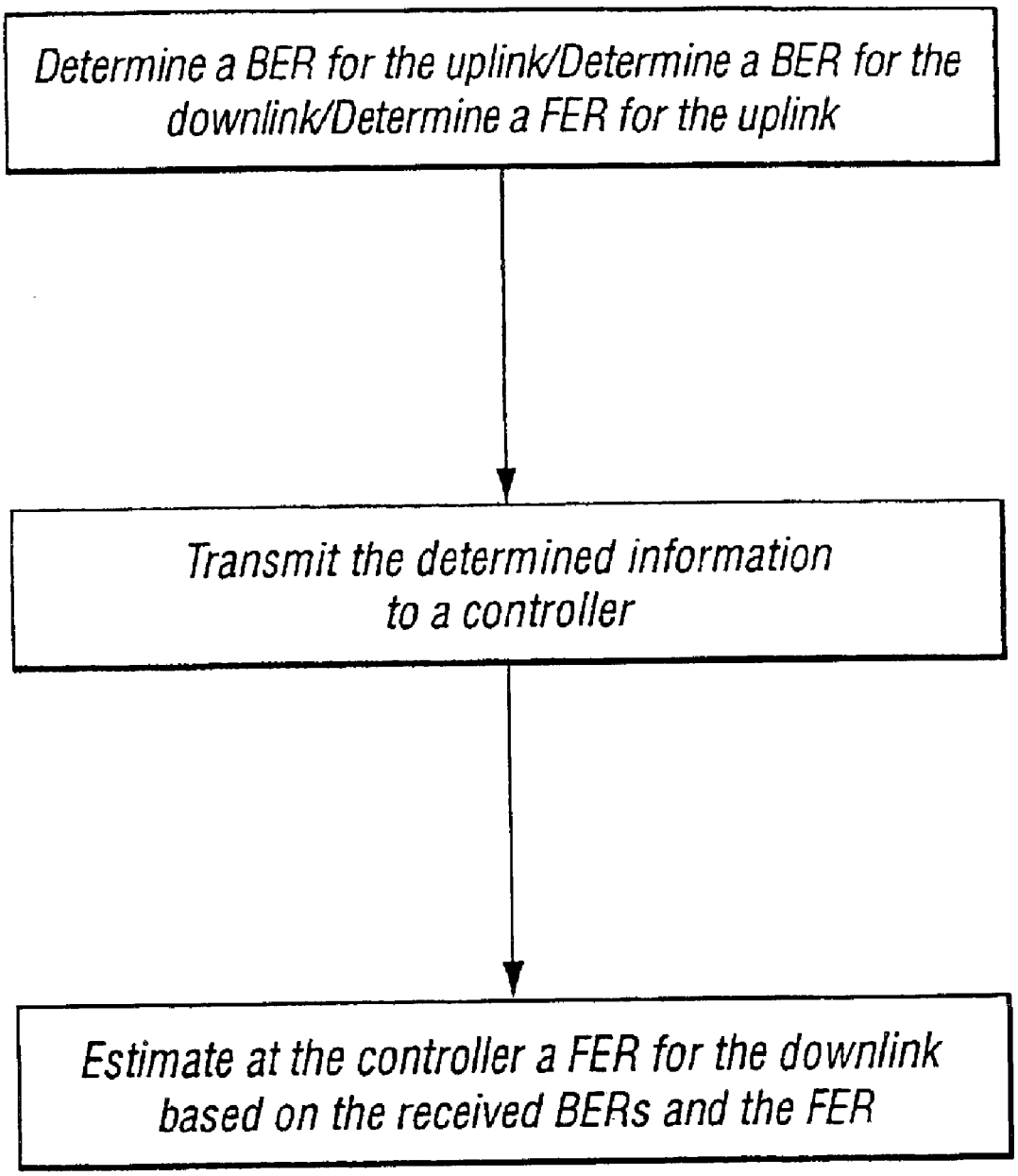
FIG. 3 is a flowchart illustrating the operation of one embodiment of the present invention.

The mobile stations and the base station are arranged to perform measurements in order to be able to provide predefined information to the controller. These measurements may be of any appropriate feature that is in some way indicative of the quality or some other characteristics of traffic communications over the link between the mobile station and the base station The information may comprise various parameters or indicators, such as an indicator from which it is possible to estimate the quality of the connection. Examples are signal strength of the base station for the cell as received at the mobile station and vice versa, error rate of communications (e.g. bit error rate or frame error rate), or delay or distortion of such communications. The information of the measurement results may then be used e.g. by the controller functionality. For example, the controller may use the information to decide an appropriate cell that can be selected for serving the mobile station FIG. 2 shows in more detail a mobile station and base station pair capable of operation in the system of FIG. 1. The mobile station, which in this case is a cellular telephone, includes a radio transceiver unit 20, a measurement unit 21 and a control unit 22. The base station includes correspondingly a radio transceiver unit 23, a measurement unit 24 and a control unit 25. The controller BSC is shown to include a control unit 26 for accomplishing computations of the embodiments of the invention. These units may be implemented as distinct units as illustrated in FIG. 2 or by software running on common hardware.

The transceiver 20 of the mobile station transmits traffic signals to and receives traffic signals from one or more base stations to which the mobile station is currently attached.

The transmissions to and from the mobile station are split into multiframes, each of which occupies a certain predefined time, e.g. 480 ms. The transceiver may also receives signals from other base stations, typically signals on one or more broadcast channels e.g. BCCH. These signals as well as signals received from the base station(s) to which the mobile station is attached are directed to the measurement unit 21. The measurement unit measures a predefined feature of those signals as mentioned above—for example the bit error rate (BER) of the received signal. The measurement results are passed to the control unit 22 which generates appropriate measurement reports in accordance with the used standard. The measurement reports are then transmitted to the base station(s) to which the mobile station is attached. The measurement reports are then used by the network, e.g. to make handover or load balancing decisions.

The mobile station MS is arranged to measure and report a downlink bit error rate (DL BER) for the signals received from the base station BTS to the controller BSC via the base station BTS by an appropriate measurement report mechanism. For example, in the GSM networks the BER is reported by the mobiles to the system as RXQUAL message (received transmission quality). The base station is arranged to measure an uplink bit error rate (UL BER) for the transmission received from the mobile station. The UL BER is reported to the BSC in order to be used for statistics and the handover and power control mechanisms. The UL BER may also be used in one of embodiments of the invention, as will be described later in this specification. The base station BTS is also arranged to determine a uplink erasure ration (UL FER) based on Bad Frame Indicator (BFI) calculations.

According to an embodiment of the invention the UL FER, UL BER and DL BER are used to estimate the DL FER. In this embodiment the estimation is be based on the realisation that the changes and/or new features, such as Frequency Hopping and Dynamic Channel Coding, have the same effect over the Error Correction mechanism in the uplink and downlink directions. Therefore the change in the indicators is also equivalent. This means that the correlation between the BER and the FER in the Uplink will be the equivalent to the corresponding correlation of the BER and the FER in the downlink. Thus by calculating a BER-FER correlation in up-link the DL FER can be derived from by means of the DL BER. This can be exemplified by the equation:

$$DL\ FER = DL\ BER \times UL\ FER / UL\ BER$$

The required calculations for the estimation may be accomplished in the network controller, such as the BSC. According to one alternative the calculations are accomplished in the base station by the control unit 25 thereof.

The above embodiment enables use of the FER even with terminals that do not support FER reporting, and thereby the embodiments enable FER based quality estimation even when such mobile stations are used.

According to an alternative the mobile station determined two indicators for the connection quality and is provided with an indicator (e.g. UL BER) determined by the base station. In this embodiment the mobile station will then determine the "missing" indicator from the comparison of the three measured indicators. In other words, in this case the above presented exemplifying equation would be:

$$UL\ FER = UL\ BER \times DL\ FER / DL\ BER$$

It should be appreciated that whilst embodiments of the present invention have been described in relation to mobile stations, embodiments of the present invention are applicable to any other suitable type of user equipment, including terminals with fixed line connections.

It is also noted herein that while the above describes exemplifying embodiments of the invention, there are several variations and modifications which may be made to the disclosed solution without departing from the scope of the present invention as defined in the appended claims.

What is claimed is:

1. A method in a communication system for estimating a network indicator of a communication path between a first station and a second station comprising:

determining at the second station a first indicator of the communication path in a direction from the first station to the second station;

determining at the first station a second indicator of the communication path in a direction from the second station to the first station, said second indicator associating with a corresponding feature of the communication path than said first indicator;

determining at the second station a third indicator of the communication path in the direction from the first station to the second station; and estimating the network indicator of the communication path in the direction from the second station to the first station based on the determined first, second and third indicators, said network indicator associating with a corresponding feature of the communication path than said third indicator.

2. A method according to claim 1, wherein the second station comprises a base station of a cellular communication system, the first station comprises a mobile station of the cellular communication system, the communication path comprises a radio link between the stations, the first indicator comprises a bit error ratio in uplink direction, the second indicator comprises a bit error ratio in downlink direction; the third indicator comprises a frame erasure ratio in uplink direction; and the network indicator to be estimated comprises a frame erasure ratio in downlink direction.

3. A method according to claim 1 or 2, wherein the estimated network indicator is used for assessing the quality of the communication path.

4. A method according to claim 3, wherein voice quality of the transmission via the communication path is assessed.

5. A method according to any of the preceding claims, wherein the network indicator is obtained based on a correlation between the first indicator, the second indicator and the third indicator.

6. A method according to claim 5, wherein the network indicator is obtained by multiplying said second indicator by the third indicator and dividing the result by the first indicator.

7. A method according to any of the preceding claims, comprising passing information about the first indicator, the second indicator and the third indicator to a controller of the communication system and computing the network indicator by the controller.

8. A communication system comprising:
a first station;
a second station;
a communication path between the first and the second stations;
a measurement unit at the second station for determining a first indicator of the communication path in a direction from the first station to the second station;
a measurement unit at the first station for determining a second indicator of the communication path in a direction from the second station to the first station, said second indicator associating with a corresponding feature of the communication path than said first indicator;
a measurement unit at the second station for determining a third indicator of the communication path in the direction from the first station to the second station; and
control unit for estimating a further indicator of the communication path based on the determined first, second and third indicators, said further indicator associating with a corresponding feature of the communication path than said third indicator.

9. A communication system according to claim 8, wherein the second station comprises a base station of a cellular communication system, the first station comprises a mobile station of the cellular communication system, the communication path comprises a radio link between the stations, the first indicator comprises a bit error ratio in uplink direction, the second indicator comprises a bit error ratio in downlink direction; the third indicator comprises a frame erasure ratio in uplink direction, and the further indicator comprises a frame erasure ratio in downlink direction.

10. A communication system according to claim 8 or 9, wherein the estimated indicator is used for assessing the quality of the communication path.

11. A communication system according to any of claims 8 to 10, wherein the control unit is arranged to correlate the first indicator, the second indicator and the third indicator for obtaining the further indicator.

12. A control unit for a communication system, the control unit being arranged to estimate indicator of a communication path between a first station and a second station based on.
a first indicator of the communication path in a direction from the first station to the second station;
a second indicator of the communication path in a direction from the second station to the first station, said second inducator associating with a corresponding feature of the communication path than said first indicator; and
a third indicator of the communication path in the direction from the first station to the second station.

13. A control unit according to claim 12, wherein said network indicator is associated with a corresponding feature of the communication path than said third indicator, and said network indicator indicates a property of the communication path in the direction from the second station to the first station.

14. A control unit according to claim 12, wherein in second station comprises a base station of a cellular communication system, the first station comprises a mobile station of the cellular communication systems, the communication path comprises a radio link between the stations, the first indicator comprises a bit error ratio in uplink direction, the second the second indicator comprises a bit error ratio in downlink direction; the third indicator comprises a frame erasure ratio in uplink direction, and the netowrk indicator comprises a frame erasure ratio in downlink direction.

15. A control unit according to claim 12, wherein the network indicator is obtained based on a correlation between the first indicator, the second indicator and the third indicator.

16. A control unit according to claim 12, wherein the network indicator is obtained by multiplying said second indicator by the third indicator and dividing the result by the first indicator.

17. A base station for a communication system, the base station being arranged to estimate a network indicator of a communication path between a mobile station and the base station on:
a first indicator of the communication path in a direction from the mobile station to the base station;
a second indicator of the communication path in a direction from the base station to the mobile station, said second indicator associating with a corresponding feature of the communication path than said first indicator; and
a third indicator of the communication path in the direction from the mobile station to the base station.

18. A base station according to claim 17, wherein said network indicator is associated with a corresponding feature of the communication path than said third indicator, and said network indicator indicates a property of the communication path in the direction from the base station to the mobile station.

19. A base station according to claim 17, wherein the communication path comprises a radio link between the stations, the first indicator comprises a bit error ratio in uplink direction, the second indicator comprises a bit error ratio in downlink direction; the third indicator comprises a frame erasure ratio in uplink direction, and the network indicator comprises a frame erasure ratio in downlink direction.

20. A base station according to claim 19, wherein the network indicator is obtained based on a correlation between the first indicator, the second indicator and the third indicator.

21. A base station according to claim 20, wherein the network indicator is obtained by multiplying said second indicator by the third indicator and dividing the result by the first indicator.

* * * * *

UNITED STATES PATENT AND TRADEMARK OFFICE
CERTIFICATE OF CORRECTION

PATENT NO. : 6,928,267 B2  Page 1 of 1
APPLICATION NO. : 10/089421
DATED : August 9, 2005
INVENTOR(S) : Juan Melero It is certified that error appears in the above-identified patent and that said Letters Patent is hereby corrected as shown below:

On The Title Page:
Item (86) should read PCT No.: PCT/EP00/09499

§ 371 (c)(1),
(2), (4) Date: Jul. 10, 2002

Signed and Sealed this

Fifth Day of September, 2006

JON W. DUDAS
*Director of the United States Patent and Trademark Office*